I. H. KENDALL.
MILK TESTING BOTTLE.
APPLICATION FILED FEB. 9, 1916.
1,221,455.
Patented Apr. 3, 1917.
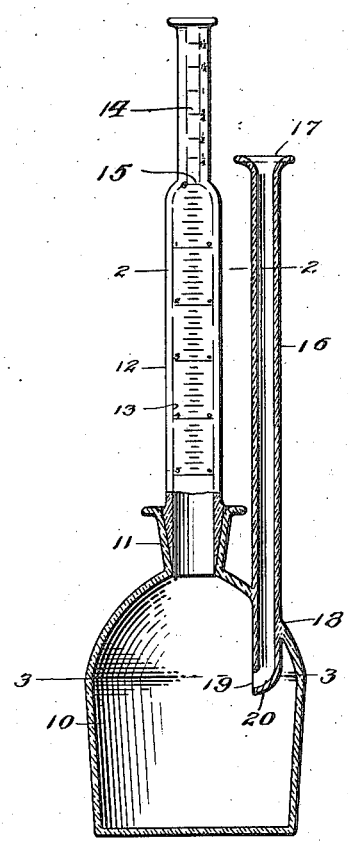
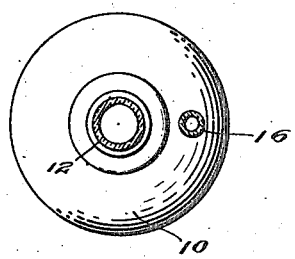
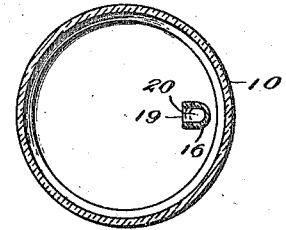
Inventor,
Ira H. Kendall,
By Mason Fenwick Lawrence,
Attorneys

UNITED STATES PATENT OFFICE.

IRA HUNT KENDALL, OF POTSDAM, NEW YORK.

MILK-TESTING BOTTLE.

1,221,455.　　　　　　　Specification of Letters Patent.　　Patented Apr. 3, 1917.

Application filed February 9, 1916. Serial No. 77,344.

*To all whom it may concern:*

Be it known that I, IRA H. KENDALL, a citizen of the United States, residing at Potsdam, in the county of St. Lawrence and State of New York, have invented certain new and useful Improvements in Milk-Testing Bottles; and I do hereby declare the following to be a full, clear, and exact description of the invention, such as will enable others skilled in the art to which it appertains to make and use the same.

This invention relates to milk testing bottles and more particularly to that type used in testing whole milk, cream or other dairy products containing butter fat to ascertain the percentage thereof.

It has for an object to provide an improved form of construction which permits all parts thereof being easily cleaned.

A further object of this invention is the provision of a testing bottle having separate filling and reading tubes and having the filling tube so disposed as to permit pressure exerted therein to flatten the lower meniscus of a column of butter fat in the reading tube.

A further object of this invention is the provision of a filling tube having the lower end thereof formed to expose the passage therethrough perpendicularly to the major portion of the filling tube to provide against the entrance of butter fats and the like into said tube, as the level of the contents of the bottle is varied by the admission of a liquid through the filling tube.

A further object of this invention is the provision of a reading tube having two portions of different internal diameters of which the portion of larger diameter receives the bulk of the butter fat or the like being read, and that portion of the tube of smaller diameter receives a small portion of the butter fat or the like, which smaller portion is graduated in fractions of the unit indicated by the graduation on the portion of the tube having the larger diameter.

Further objects will be apparent from the following specification, appended claims and drawings, in which, Figure 1 is a vertical sectional view of a testing bottle showing the reading tube in elevation, Fig. 2 is a horizontal sectional view as on the line 2—2 of Fig. 1, and Fig. 3 is a similar view as on the line 3—3 of Fig. 1.

This testing bottle is intended for use in connection with a centrifuge and is intended for determining the percentage of butter fat in a sample of a predetermined volume in which the butter fat is separated from the liquid by use of an acid commonly used in such tests.

Referring to the drawings, 10 indicates a bottle having a flaring neck 11 in which the lower end of the reading tube 12 is carried. The reading tube 12 is formed in portions of different diameters to form bores 13 and 14 of different capacities. The tube is graduated in opposite directions from a predetermined point 15 which indicates zero and this point occurs at the junction of the two portions of the tube of different internal diameters. To one side of this point along that portion of the tube having the larger diameter, the graduations indicate multiples of a given unit, and to the opposite side of the zero point, that portion of the tube having the smaller diameter the graduations indicate fractions of the unit indicated by the graduations on the larger portion of the tube. In each instance, the graduations will be such as to equal fractions or multiples of per cents. of the volume of sample to be tested.

The bottle 10 is also provided with a filling tube 16 which has a flaring upper end 17, and this tube passes through the wall of the bottle where it is attached as at 18. The lower end of the tube 16 is bent at right angles within its diameter to cause the passage or opening 19 to be disposed perpendicularly to the major portion of the tube or the same result may be accomplished by bending or forming one side of the lower end of the tube to deflect the fluids passing through said tube at substantially right angles as shown at 20.

The reading tube 12 may be detachably carried by the neck 11, and it is apparent that in making the tube detachable from the bottle, access to the interior of the bottle and the tube for cleaning purposes is had more freely. In making a test, a predetermined volume of the liquid to be tested is placed in the bottle 10 either through the neck 11 or filling tube 16, and then a predetermined quantity of acid is also admitted for the usual treatment of the liquid. The bottle is then placed in the centrifuge in the ordinary manner to subject the liquid being tested to the desired action by employing centrifugal force. The test is further carried out by the admission of distilled water or the like through the filling tube 16, at which time the butter fat is collected in the reading tube 12. As the butter fat rises, due to the admission of water or other liquids, any portion of the butter fats is prevented from entering the filling tube 16 by the particular arrangement of the lower end of this filling tube, as well as by the ingress of water from this filling tube. Sufficient water is admitted to the bottle 10 through the tube 16 to raise the column of butter fat into the tube 12, so that the bottom meniscus of said column will occur in the portion of the reading tube where the graduations indicate integers after a small portion of said column has been forced into the restricted bore, indicating a fraction of a unit. A slight pressure as by the finger of the person making the test, on the flaring neck 17 will likewise exert a corresponding pressure on the bottom of the column of butter fat and will cause the bottom meniscus of said column to flatten and thus the bottom meniscus can be practically eliminated. The upper meniscus occurs in that portion of the tube having the reduced bore, and in that portion of the tube graduated to indicate fractions of the integer indicated upon the column in the larger bore so it is therefore apparent that by flattening the lower meniscus and restricting the upper meniscus to a fractional portion of a unit indicated in the bulk of the column, a more perfect reading is had.

In making the tubes 12 and 16 straight and in having the tube 12 removably carried by the bottle, it is apparent that all parts of the bottle may be easily cleaned after the test.

The reading tube 12 may have several portions of different diameters if desirable.

The drawings are submitted for illustrative purposes only and they are not intended to restrict this application to the specific type shown as modifications may be made without departing from the spirit of this invention.

Having thus described my invention, I claim:—

1. In a testing bottle, a reading tube having portions thereof of different diameters and graduated in opposite directions from the point of junction of said portions of different diameters.

2. In a testing bottle, a reading tube having portions thereof of different diameters, graduations on said tube, the graduations on one portion of said tube indicating integers and the graduations on the other portion of said tube indicating fractions of the integer.

3. In a testing bottle, a reading tube having portions of different diameters, one of said portions of said tube being graduated to indicate integers, the other portion of said tube being graduated to indicate fractions of the integer, and a separate filling tube, permitting exertion of a pressure within said reading tube.

In testimony whereof I affix my signature in presence of two witnesses.

IRA HUNT KENDALL.

Witnesses:
O. P. BENSON,
WILLIAM H. McCORMICK.